J. J. WALK.
AERIAL MACHINE.
APPLICATION FILED JAN. 24, 1918.
1,286,847.
Patented Dec. 3, 1918.
7 SHEETS—SHEET 1.
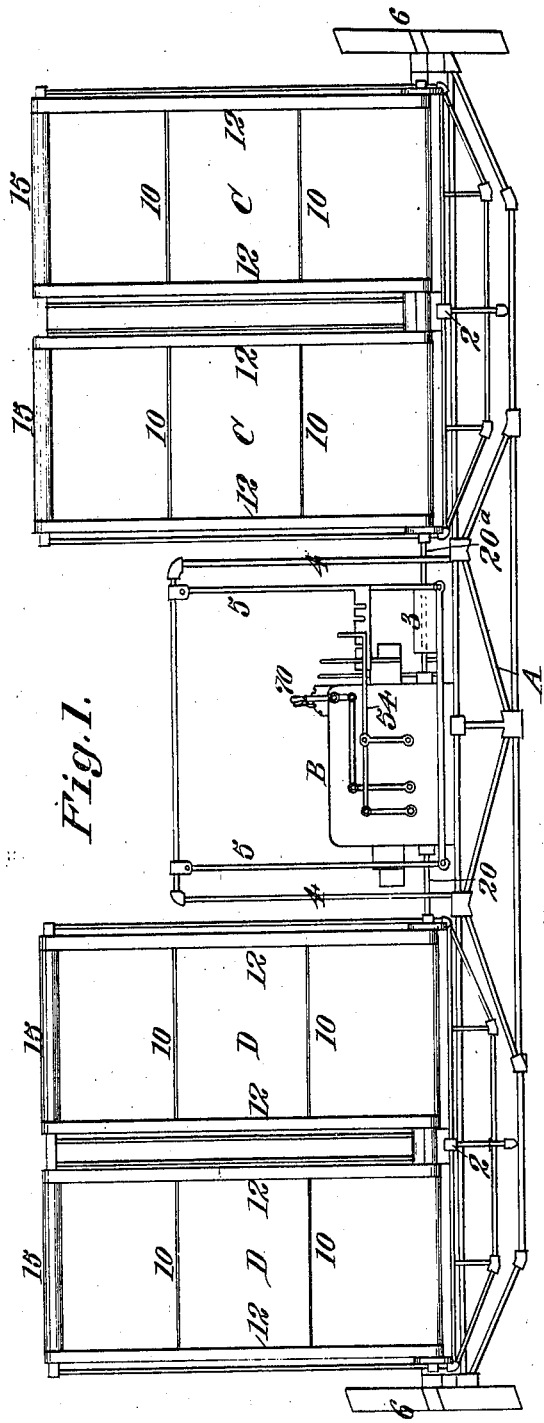
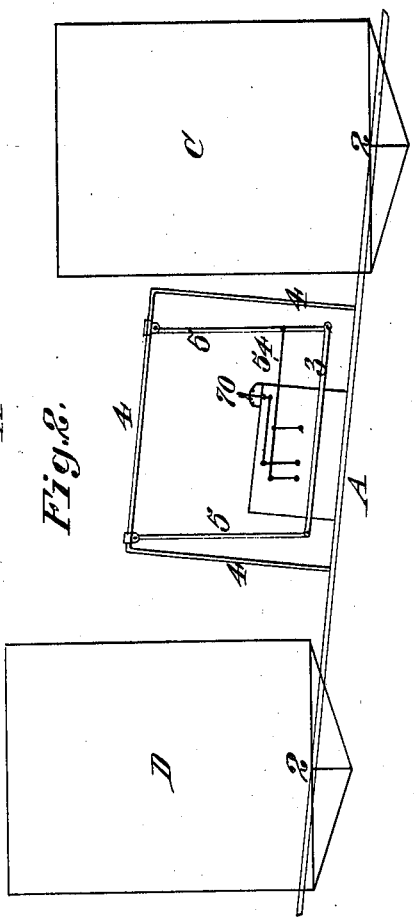
Inventor
Jasper J. Walk
By Strong & Townsend
ATTORNEYS.

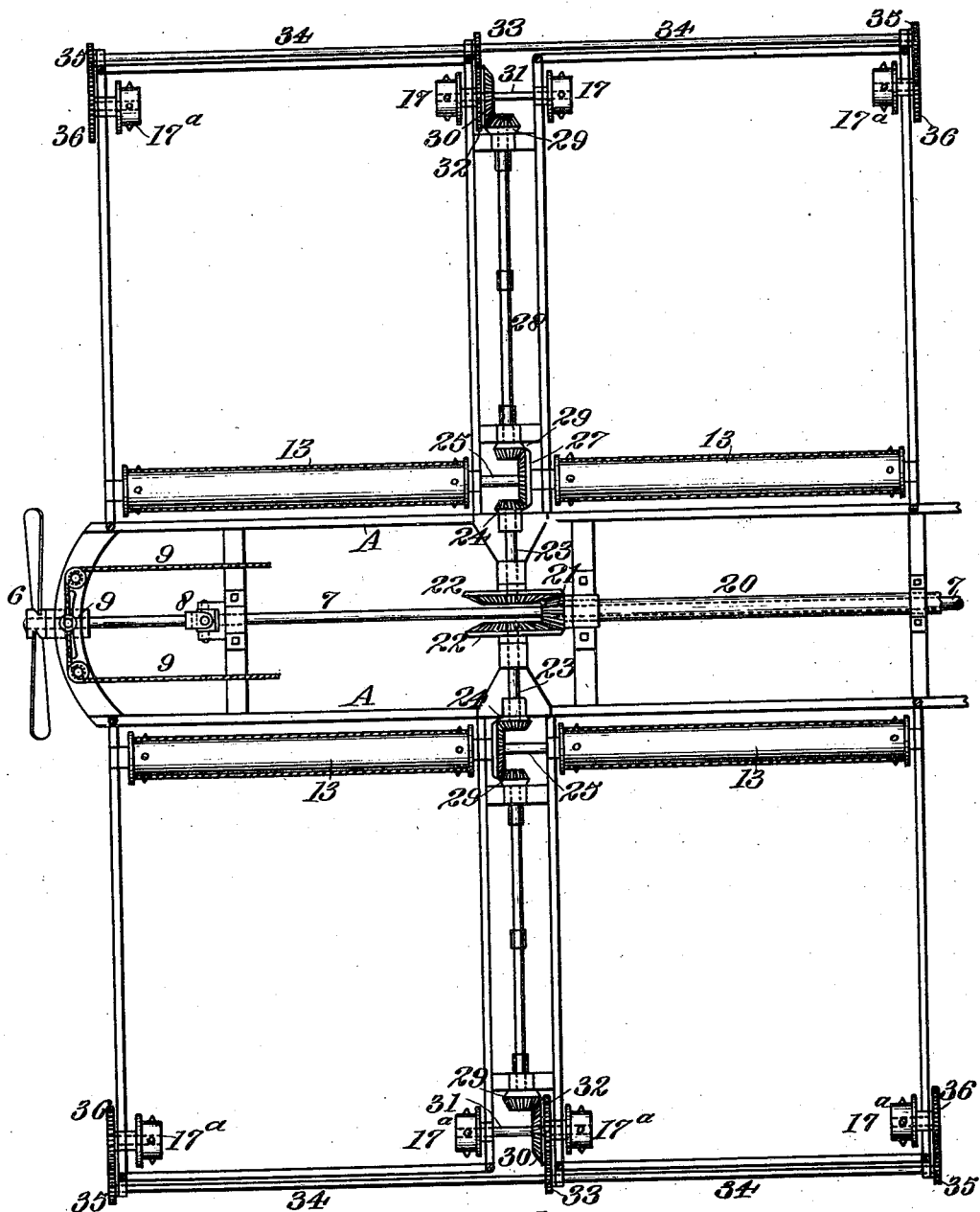

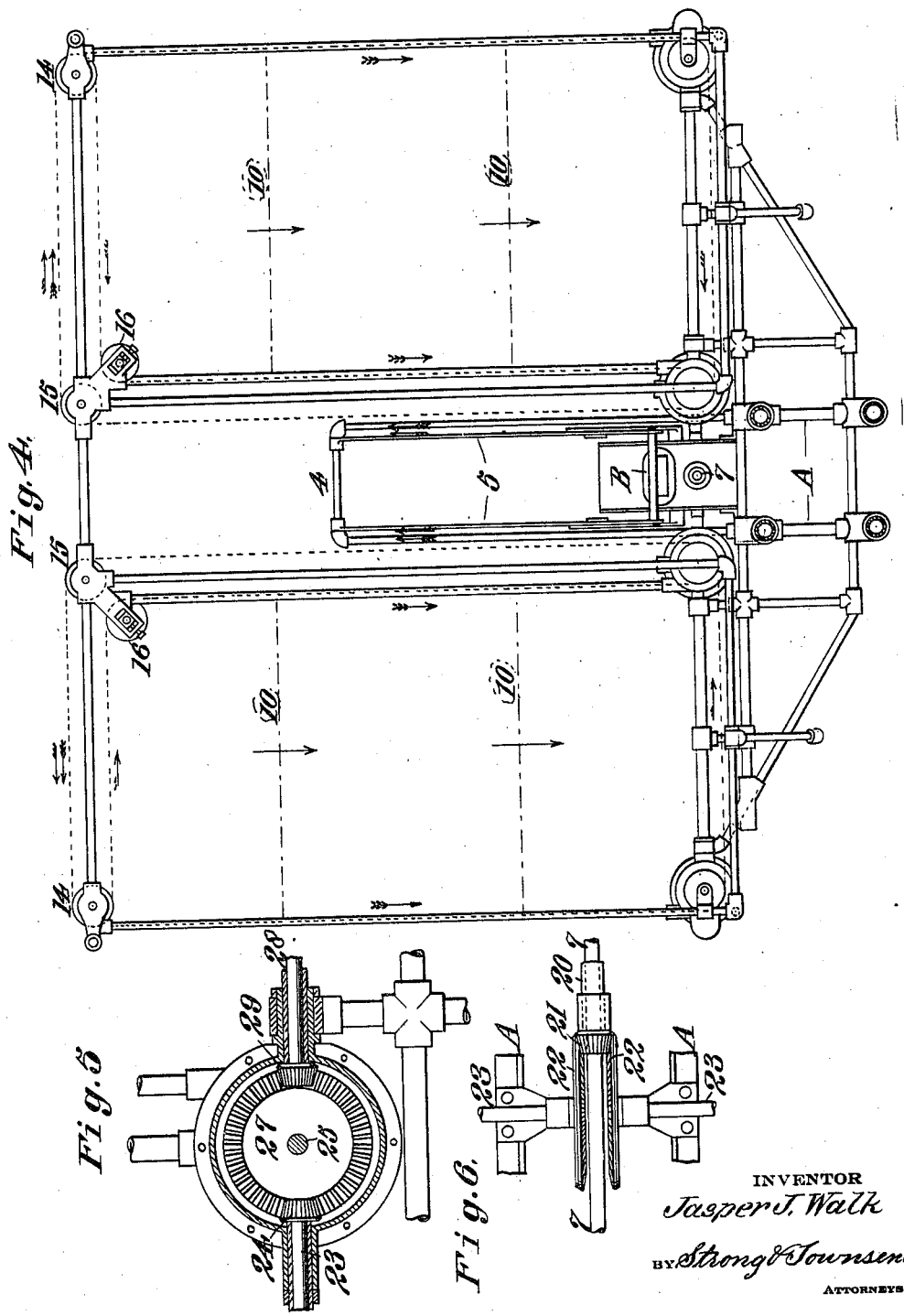

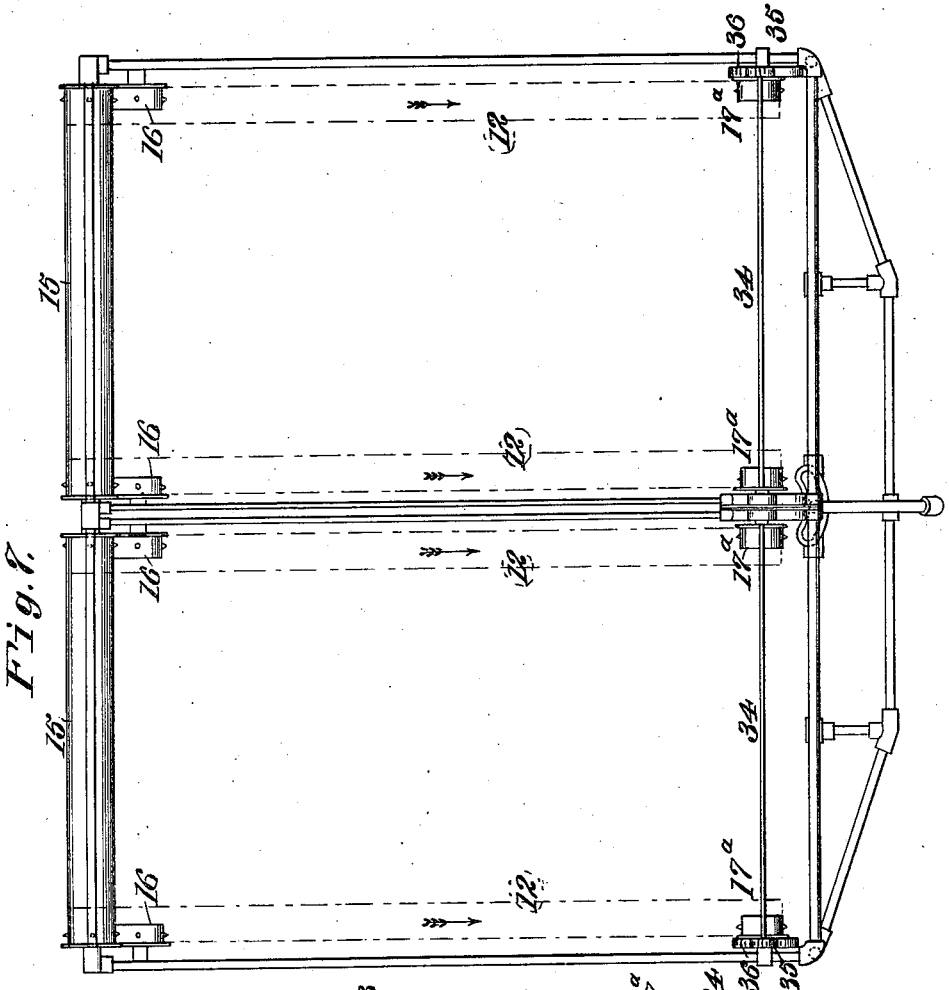
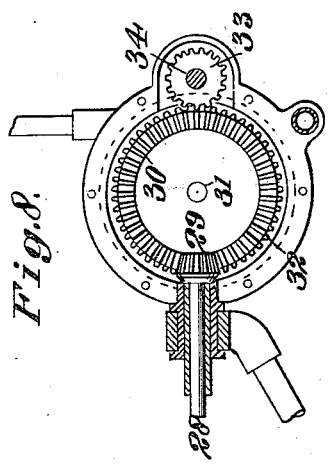
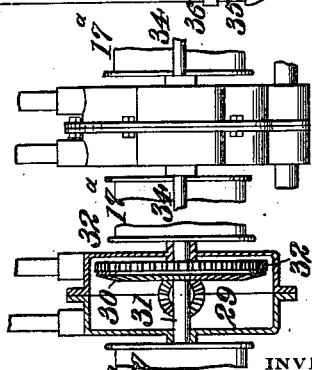

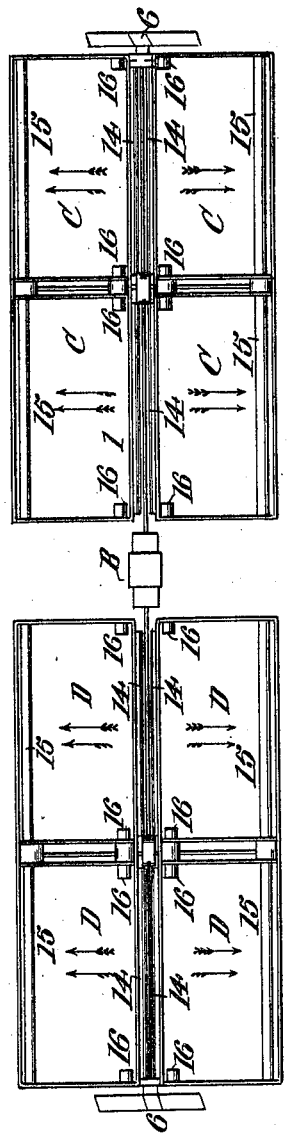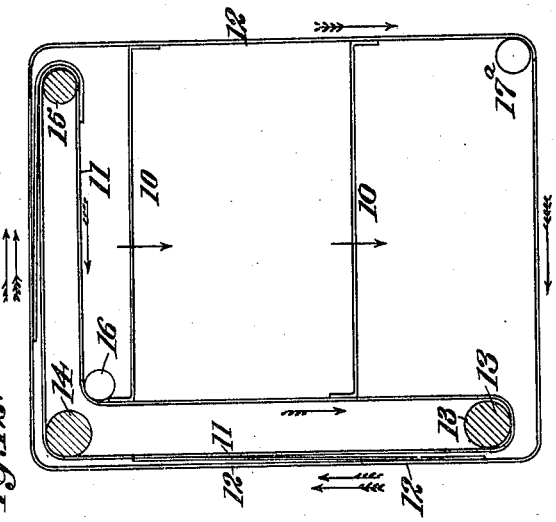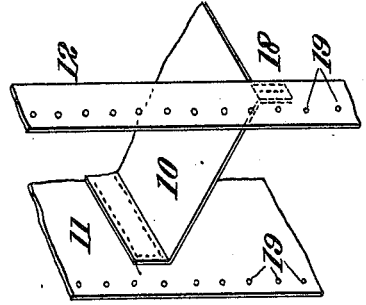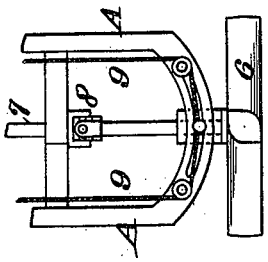

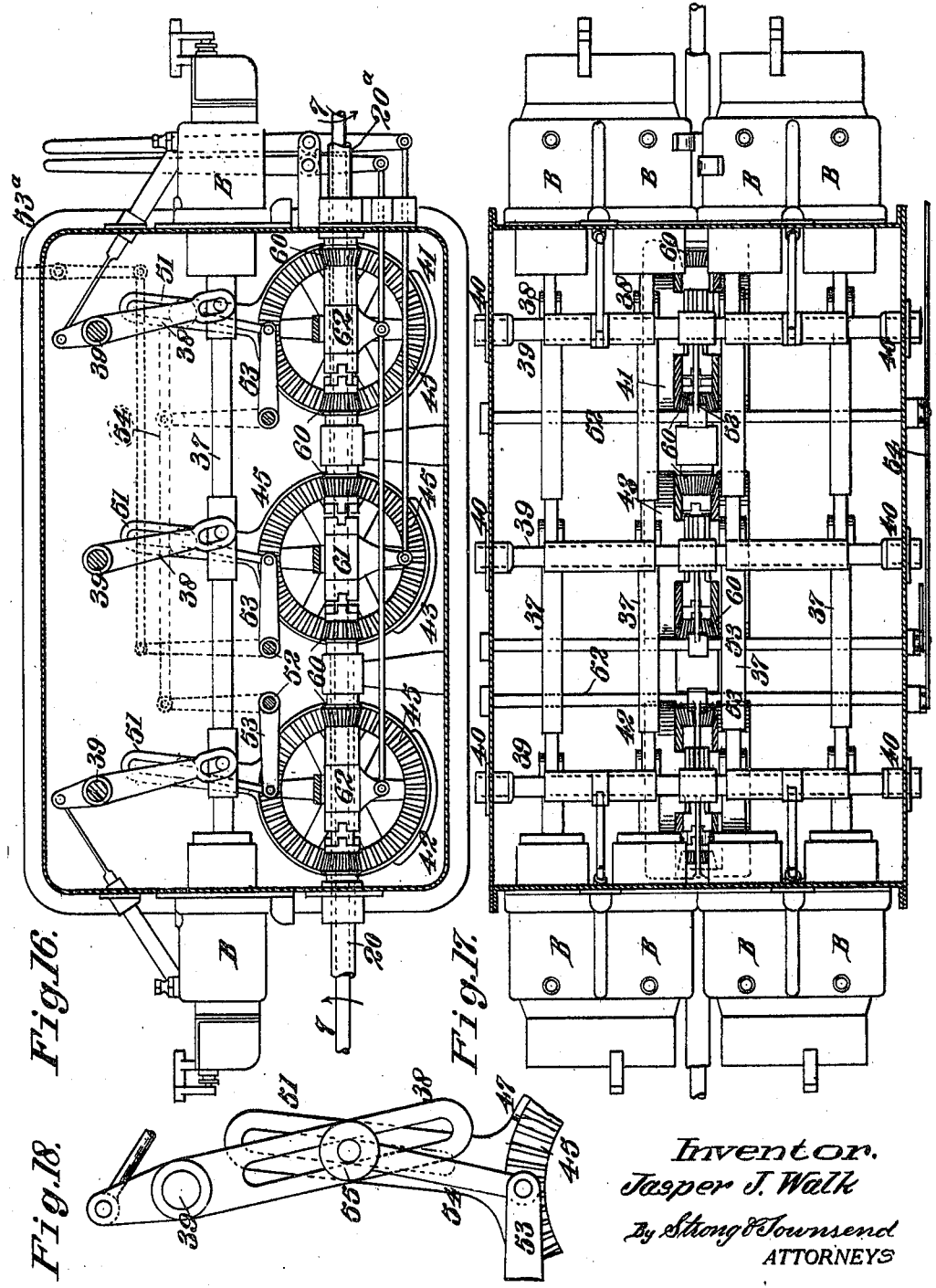

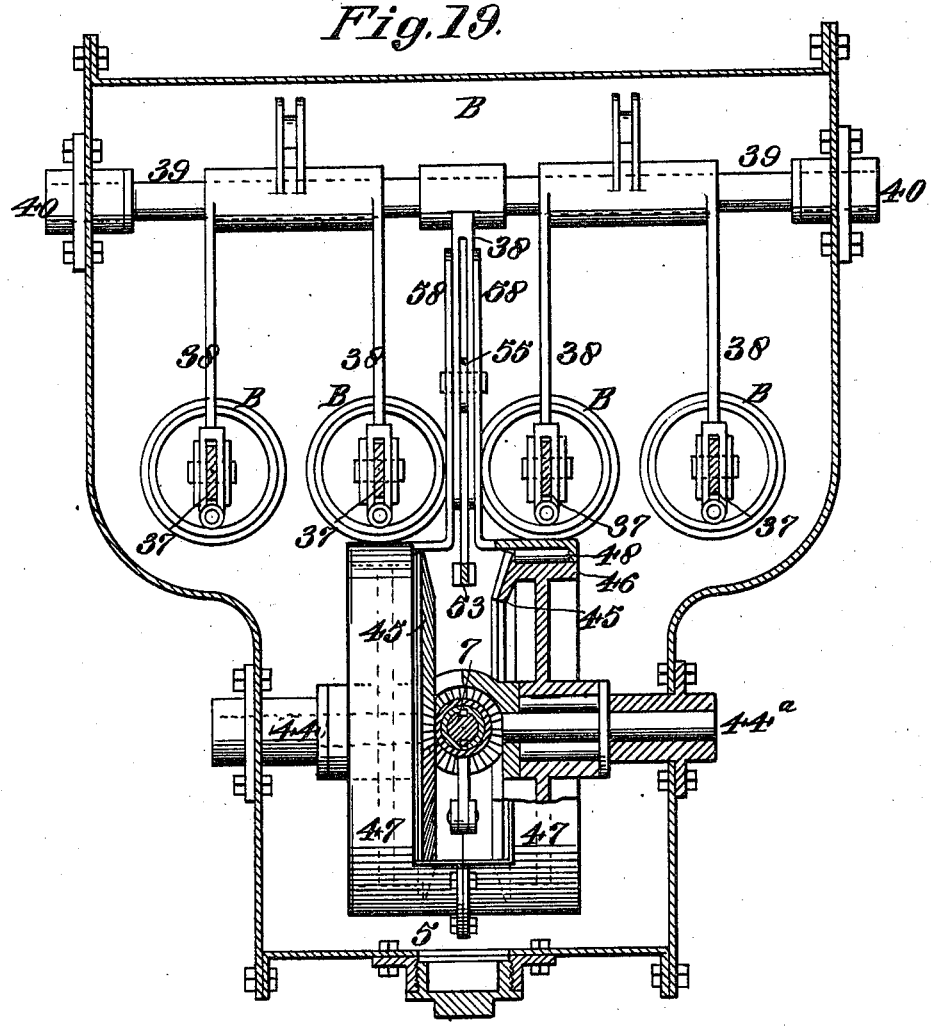
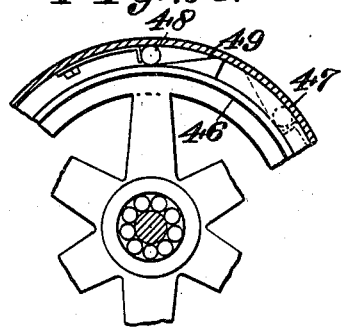

UNITED STATES PATENT OFFICE.

JASPER J. WALK, OF OAKLAND, CALIFORNIA.

AERIAL MACHINE.

1,286,847.   Specification of Letters Patent.   Patented Dec. 3, 1918.

Application filed January 24, 1918. Serial No. 213,478.

*To all whom it may concern:*

Be it known that I, JASPER J. WALK, a citizen of the United States, residing at Oakland, in the county of Alameda and State of California, have invented new and useful Improvement in Aerial Machines, of which the following is a specification.

This invention relates to a flying machine.

One of the objects of the present invention is to construct a flying machine which employs a pair of vertically traveling lifting wings or planes. These wings are arranged in pairs at each end of a main frame which also serves as a support for an engine capable of driving each set of planes at varying speeds or independent of each other, said engine being also adapted to drive a pair of propellers arranged fore and aft on the main frame at varying speeds either ahead or reverse. Another object of the invention is to provide means for automatically maintaining the equilibrium of the machine when in flight and furthermore to provide manually controlled means for directing the course of the machine in flight or when ascending or descending. Further objects will hereinafter appear.

The invention consists of the parts and the construction and combination of parts as hereinafter more fully described and claimed, having reference to the accompanying drawings, in which—

Figure 1 is a side elevation of the machine.

Fig. 2 is a diagrammatic side elevation of the same.

Fig. 3 is a plan view of one end of the machine showing the gear transmission through which the lifting planes are propelled and also showing the position of one of the driving propellers.

Fig. 4 is a cross section of the main frame showing the position of the plane or wing supporting frames.

Fig. 5 is a detail view, partly in section, of the casing inclosing the gears 24, 27 and 29.

Fig. 6 is an enlarged detail view of the end of one of the sleeve shafts showing how power is transmitted to the cross shafts.

Fig. 7 is a side elevation of one of the wing-supporting frames.

Fig. 8 is an enlarged detail view, partly in section, of the casing inclosing the gears 30, 32 and 33.

Fig. 9 is a cross section on the line 9—9 of Fig. 8.

Fig. 10 is an exterior end view of Fig. 8.

Fig. 11 is a diagrammatic plan view of the machine.

Fig. 12 is a diagrammatic end view of the belts which support and drive the wings or lifting planes of the machine.

Fig. 13 is an enlarged detail side elevation of one of the lifting planes in folded position.

Fig. 14 is a perspective detail view, partly broken away, showing one of the planes in lifting position.

Fig. 15 is a detail plan view of the steering propeller.

Fig. 16 is a side elevation, partly in section, of the engine.

Fig. 17 is a plan view, partly in section, of Fig. 16.

Fig. 18 is an enlarged detail view of the oscillating clutch levers.

Fig. 19 is an enlarged vertical cross section of the engine.

Fig. 20 is a detail view of one of the oscillating clutches.

Referring to the drawings in detail, A indicates a main frame which extends longitudinally of the machine as a whole. This frame forms a support for an engine indicated at B, hereinafter to be described, and two sets of lifting planes C and D arranged fore and aft of the main frame. These lifting frames are pivotally attached to the main frame, as indicated at 2, and may therefore always assume a vertical position, as shown in Fig. 2, when the machine is ascending or descending.

The main frame also serves as a support for an automatic stabilizer comprising a platform 3 hung pendulumwise from a rigid upright frame 4 by means of links 5. It further serves as a support for a pair of propellers 6 arranged one at each end of the machine. These propellers are connected to a main driving shaft 7 by means of a pair of universal joints 8 and it therefore becomes possible to control the course of the machine when in flight by swinging the propellers horizontally in opposite directions by means of cables attached thereto, as shown at 9. These cables may be operated in any suitable manner. For instance, they may be passed over a steering wheel or other suitable means, which, when turned, pays out one cable while it pulls in on the other, thus swinging the propellers horizontally in opposite directions and changing the course of the machine accordingly.

The wings or planes indicated at 10, by which the machine is lifted, form one of the important features of the present invention. They are designed to assume a horizontal plane when moving downwardly toward the main frame A and to assume a vertical position when traveling upwardly. This is accomplished in the following manner:

Referring particularly to Fig. 12, it will be seen that two endless belts 11 and 12 have been provided. The belt 11 is carried by pulleys 13, 14, 15 and 16 while the belt 12 is carried by pulleys 13, 14, 15 and 17. The lifting planes, together with the belts, may be constructed of any suitable material. The belt 11 is as wide as the planes and extends from end to end of the rollers carrying the same while the belt 12 is strip-like, as shown in Fig. 14, and merely supports the outer ends of the planes, as at 18. Both belts are perforated along their edges, as shown at 19, to engage teeth formed on the pulleys carrying the same, thereby preventing slippage and also insuring a uniform travel of one belt with relation to the other. The position of the pulleys carrying the belts is such that a lifting plane 10 will assume a horizontal position when traveling in a downward direction and it will assume a vertical position, as shown at 10$^a$, when traveling in an upward direction. No resistance is therefore offered to the upward movement of the lifting planes while the full area is exerted in a downward direction when the planes are moved into working position.

The present machine is provided with four pairs of lifting planes arranged substantially as shown in Fig. 11, that is, two pairs are positioned forwardly of the engine, generally indicated at B, while the other two pairs are arranged rearwardly of the engine. Each set of planes comprising two pairs is driven in unison but the speed of the two forward pairs may be increased with relation to the two rear pairs, or vice versa, if it is desired to ascend or descend during flight. That is, the machine when ascending or descending must necessarily assume the position shown in Fig. 2, if it is ascending and traveling in a forward direction simultaneously, or it will assume a position shown in Fig. 1 if it is being lifted vertically without traveling in a forward direction, it being understood that the driving propellers remain at rest if it is desired to lift the machine vertically or to maintain it stationary over some object while in the air, the speed of the lifting planes being controlled as will hereinafter be described so that the machine may practically stand stationary in space when desired.

The pulleys over which the belts 11 and 12 carrying the lifting planes pass are driven in the following manner: Referring to Fig. 3, 20 indicates a sleeve shaft. Secured on the end of said shaft is a pinion 21 which intermeshes with a bevel gear 22. This gear is secured on a cross shaft 23 journaled as shown and provided with a bevel pinion 24 at the opposite end. Journaled parallel with the main frame A is a shaft 25. This shaft carries a pair of pulleys 13 and a bevel gear 27 which intermeshes with the pinion 24. Journaled at right angles to the shaft 25 is an intermediate shaft 28 and secured on each end of said shaft is a bevel pinion 29, one intermeshing with the bevel gear 27 and the opposite with a bevel gear 30 secured on a cross shaft 31. This shaft carries a pulley 17 at each end and it also carries a spur gear 32 which intermeshes with a spur pinion 33 secured on a shaft 34. This shaft has a spur pinion 35 secured on each end which intermeshes with a pair of spur gears 36 secured on shafts alined with the cross shaft 31. These shafts each carrying a pulley 17$^a$. Two sets of planes are driven by means of the pulleys 17 and 13 through the gear train represented by gears 21, 22, 24, 27, 29, 30, 33, 35 and 36. As these gear trains are duplicated one on each side of the main frame, it can readily be seen that each pair of planes must be driven in unison and at a uniform speed, slippage of the belts supporting the planes being positively prevented as all the pulleys 13, 14, 15, 16 and 17 are provided with teeth, as shown in Fig. 3, to prevent slipping of one belt with relation to the other.

The forward set of planes consisting of two pairs is driven by the sleeve shaft 20 while the rear set of lifting planes also consisting of two pairs are driven by the sleeve shaft 20$^a$. The propeller shaft 7 extends through the two sleeve shafts (see Figs. 3 and 16) and may therefore be driven absolutely independent of same. Fig. 3 shows the frames C and D tiltable with relation to the main longitudinal frame A, since the propeller shaft 7 is supported in journals carried by the main frame A, and the sleeve shaft 20 surrounding the propeller shaft is also supported by said journals. The pinion 21 on the outer end of the sleeve shaft meshes with the gears 22, and this in turn drives the gears and shafts by which the wings carried on the tilted frames C and D are operated. The bearings supporting the shafts 23 are supported by the main frame A and the pivotal point about which the frames D and C swing are said bearings. As the center line passes through said bearings and the shafts 28, it will be obvious that the frames may tilt. The sleeve shafts may also be driven independent one with relation to the other so that the two sets of forward planes may be driven at a higher speed than the two sets of rear planes, or vice versa. This is accomplished by providing an engine having a specific form of transmission mechanism, to-wit:

B indicates the cylinders of the engine. These cylinders are placed in direct alinement and opposite each other, as shown in Figs. 16 and 17. The pistons in the engine are directly connected by rigid piston rods 37 and the rods are in turn connected through means of rocker arms 38 which are rigidly secured on rocker shafts 39 extending crosswise of, and journaled in, the main frame, as indicated at 40. Movement is transmitted to revolve the sleeve shaft 20$^a$ through an oscillating clutch, generally indicated at 41. The sleeve shaft 20 is driven through an oscillating clutch 42 and the propeller shaft 7 is driven through an oscillating clutch, shown at 43. The construction of each clutch is identical and one clutch will therefore be described as the operation and construction of each is nothing more than duplication.

Arranged crosswise of the main frame 40 supporting the cylinders, the sleeve shafts 20 and 20$^a$ and the propeller shaft 7, is a pair of stationary cross shafts 44 and 44$^a$. Turnably mounted on each cross shaft is a bevel gear 45 and formed on each gear is a roller clutch member consisting of a drum 46. Turnably mounted on the exterior of each drum is a coöperating clutch section 47 and interposed between the clutch sections 46 and 47 are rollers 48. The drums of clutch sections 46 have inclined faces 49 formed thereon, the inclined faces on one drum being opposite to those on the other drum. Oscillating movement transmitted to the clutch sections 47 will therefore cause one clutch section to grip a drum 46 when the clutches are rocked in one direction and to grip the opposite drum 46 when it is rocked in the opposite direction, this being due to the fact that the clutch sections 47 are secured together, as at 50, and rocked in unison by means of a lever 51, which, in turn, is rocked through the medium of the rocker arm 38.

The length of the oscillating movement of the arm 38 is constant or equal to the piston stroke while the rocking movement of the arm 51 may be varied. This is of considerable importance in the present instance as it provides a means for increasing or decreasing the speed of either sleeve shaft without changing the engine speed. This is accomplished in the following manner:

Journaled in the casing is a cross shaft 52 and secured on said shaft is a bell crank 53. One end of this bell crank is connected through a link 54 (see Fig. 18) with a cross head 55. This cross head extends through slots formed in the arms 38 and 51 respectively and therefore serves as a connection between the arms 38 and 51 by which the stroke or rocking movement of arm 51 and the clutches secured thereto may be actuated. For instance, it can readily be seen by referring to Fig. 18 that movement of the cross head 55 in an upward direction will shorten the stroke of the arm 51 due to the fact that it approaches the rocker shaft 39 about which arm 38 swings and that it will lengthen the stroke of arm 51 when the cross head is lowered due to the fact that the cross head approaches the pivotal point of the oscillating clutch and the radial movement of the arm 38 is increased. Practically any length of oscillating stroke may thus be transmitted to the arm 51 without changing the engine speed or piston stroke.

As previously stated, it is of great importance to provide means for varying the speeds of the two sleeve shafts 20 and 20$^a$. This is accomplished by varying the oscillating movement of the arms 51. The bell cranks 53 are therefore positioned on opposite sides of the oscillating clutches 41 and 42 (see Fig. 16) and their upper ends are connected by means of a link 54 which is attached to the pendulum frame, as at 55. Endwise movement of the main frame A causes the pendulum frame to swing and maintain a horizontal position. The link 54 therefore pulls the bell cranks in the same direction. One cross head 55 will thus move upwardly and decrease the length or oscillating stroke of one arm 51 while the opposite cross head will move down and increase the length or oscillating stroke of the opposite arm 51, thereby causing one set of lifting planes to move faster than the opposite set. The end of the machine which is depressed will thus lift until a horizontal plane is reached, permitting the pendulum frame to assume a parallel position with the main frame and to return the bell cranks to normal position where both clutches operate in absolute unison, it being understood that if one end of the main frame assumes a position lower than the opposite end of the frame then the planes on that end will travel at a greater speed than the planes on the opposite end. The greater lifting force thus exerted automatically restores the machine to equilibrium, something which is of great importance, particularly when the machine is standing at rest over a certain spot, as when dropping bombs, taking pictures or making other maneuvers.

By referring to the previous description, it will be remembered that the clutch sections 47 were oscillated in unison but that only one gear 45 would turn or respond to each swing during an oscillation due to the fact that the inclined faces formed thereon were opposed to each other. One gear will therefore rotate and be driven in one direction in unison with the clutches 47 while they are moving in one direction and will turn free in the same direction while the opposite gear turns and is driven in the opposite direction with the clutches 47 when these move back on the return movement. One gear 45 is therefore revolving continuously in one direction while the opposite gear 45 is turning continuously in the opposite direction. Pinions, such as shown at 60, interposed between the gears and constantly intermeshing with same will therefore continuously revolve one in each direction. This movement is utilized as far as the propeller shaft is concerned to drive it in either direction by providing a sliding clutch 61 which may intermesh with either gear 60, but as there is no necessity of revolving the sleeve shafts in opposite directions only one clutch for each sleeve shaft is required, as shown at 62. Both of the pinions 60 revolve free of their respective sleeve shafts while clutch sections 62 are keyed and will turn in unison with same when thrown into engagement with the gears 60. Each sleeve shaft may therefore remain at rest or they may both be driven in unison by throwing the clutches into engagement and they may also be driven at variable speeds, that is, one faster than the other by rocking the bell cranks 53 as previously described. The propeller shaft may also remain at rest by throwing out the clutch 61 or it may be driven in either direction at any speed desired, first by throwing clutch 61 into engagement with one of the gears 60 and then by rocking the bell crank 53 by means of the lever 53ª shown.

The link 54, as previously described, may be attached to the pendulum frame when it is desired to obtain automatic equilibrium. It may, however, be operated by hand whenever it is desired to tilt the machine endwise for any reason whatsoever, for instance, when it is desired to ascend when traveling in a forward direction or vice versa. The speed of the propellers may also be controlled by a hand lever, such as shown at 70, and their direction of rotation is controlled by sliding the operating clutch 61 into engagement with one or the other of the pinions 60.

The automatic equilibrium so far spoken of relates entirely to endwise movement. Lateral stability is obtained in an entirely different manner, first, by so constructing the main frame and the parts supported thereby that the center of gravity is positioned as low as possible, and, secondly, by providing the wide lifting belts 11. These belts in reality form vertical walls having a height equal to the frames C. The vertical walls thus presented assume a central position with relation to the main frame A and while they afford comparatively small resistance to forward propulsion of the machine, it can readily be seen that they serve as stabilizers against lateral movement if there is any tendency to tilt. The lateral stability is thereby taken care of and requires no attention, as far as the operator is concerned. Endwise stability may be automatically taken care of, as described, and may be regulated by hand and as forward speed is controlled mostly by the propellers, practically any maneuver is possible. That is, the machine should be able to stand, practically speaking, at rest, while in space over any stationary object; it should be capable of lifting itself vertically by operating the lifting planes only, or it should be possible to propel it in a forward direction or a rearward direction by operating the propellers either while the lifting planes 10 are standing stationary or while they are in operation. All power may thus be applied directly to the lifting planes or to the propellers or it may be uniformly or variably divided between the same.

The engine provided forms the subject-matter of a co-pending application filed Jan. 24, 1918, Serial No. 213,477. This engine forms one of the important features of the invention, inasmuch as it permits the several operations specified. It might be stated that the engine proper functions as a nervous system inasmuch as it is sensitive not only to manual and automatic control but it is also capable of distributing power where it is most needed either through manual operation or through automatic control.

Having thus described my invention, what I claim and desire to secure by Letters Patent is—

1. A flying machine comprising an elongated, rigid frame, a single engine mounted on the frame, a vertically positioned frame pivotally attached to each end of the main frame, so that each moves fore and aft of the main frame, lifting planes or wings carried by said frames, and means for transmitting power from the engine to move said wings of each vertical frame vertically.

2. A flying machine comprising an elongated, rigid frame, an engine mounted on the frame, a vertically positioned frame pivotally attached to each end of the main frame, lifting planes or wings carried by said frames, means for transmitting power from the engine to move said wings vertically, and means for automatically increasing the speed of one set of wings with relation to the other to maintain endwise equilibrium.

3. In a flying machine, a main frame, a plurality of lifting planes arranged at each end of the frame, means for imparting a vertical movement to said planes, means for holding the planes in a vertical position when traveling in an upward direction, said means also adapted to hold the planes in a horizontal position when traveling in a downward direction, an engine, means for transmitting power from said engine to drive each set of planes, and means for increasing or decreasing the speed of one set of planes with relation to the other without changing the engine speed.

4. In a flying machine, a main frame, a plurality of lifting planes arranged at each end of the frame, means for imparting a vertical movement to said planes, means for holding the planes in a vertical position when traveling in an upward direction, said means also adapted to hold the planes in a horizontal position when traveling in a downward direction, an engine, means for transmitting power from said engine to drive each set of planes, and means for automatically increasing or decreasing the speed of one set of planes with relation to the other without changing the engine speed.

5. In a flying machine, a main frame, a vertical frame at each end of the main frame, lifting means carried by the vertical frames, means common to each of the lifting means to drive same, and means for controlling said driving means for automatically increasing the speed of the lifting means of one vertical frame with respect to the lifting means of the other vertical frame to maintain endwise equilibrium including driving clutches, means for adjusting each clutch, and a pivotal connection for the adjusting means to operate same.

6. In a flying machine, a main frame, a vertical frame at each end of the main frame, lifting means carried by the vertical frames, means common to each of said lifting means to drive same, and pendulum means carried by the main frame and controlling said driving means for maintaining endwise equilibrium by varying the relative speeds of the lifting means including driving clutches, means to adjust same, and pivotal means connecting the adjusting means and connected to the pendulum to actuate said adjusting means.

7. In a flying machine, an elongated main frame, vertically positioned tilting frames, one being pivotally secured on each end of the main frame, a plurality of pulleys journaled in each tilting frame, a plurality of pairs of belts carried by each set of pulleys, and lifting planes secured to the belts adapted to assume a horizontal position when the belts are traveling in a downward direction and a vertical position when the belts are traveling in an upward direction.

8. In a flying machine, an elongated main frame, vertically positioned tilting frames, one being pivotally secured on each end of the main frame, a plurality of pulleys journaled in each tilting frame, a plurality of pairs of belts carried by each set of pulleys, lifting planes secured to the belts adapted to assume a horizontal position when the belts are traveling in a downward direction and a vertical position when the belts are traveling in an upward direction, a single engine mounted on the main frame, and means for transmitting power from said engine to drive all the belts in unison, said means also adapted to transmit variable speeds to different belts.

9. In a flying machine, an elongated main frame, vertically positioned tilting frames, one being pivotally secured on each end of the main frame, a plurality of pulleys journaled in each tilting frame, a plurality of pairs of belts carried by each set of pulleys, lifting planes secured to the belts adapted to assume a horizontal position when the belts are traveling in a downward direction and a vertical position when the belts are traveling in an upward direction, means for transmitting power to drive the belts, and means for automatically driving one set of belts faster than the other set to maintain endwise equilibrium.

10. In a flying machine, an elongated main frame, vertically positioned tilting frames, one being pivotally secured on each end of the main frame, a plurality of pulleys journaled in each tilting frame, a plurality of pairs of belts carried by each set of pulleys, lifting planes secured to the belts adapted to asume a horizontal position when the belts are traveling in a downward direction and a vertical position when the belts are traveling in an upward direction, means for transmitting power to drive the belts, means for automatically driving one set of belts faster than the other set to maintain endwise equilibrium, a propeller arranged at each end of the frame, and means for driving said propellers independently of the belts.

11. In a flying machine, an elongated main frame, a pair of tilting frames, one at each end of the main frame, said frames being pivotally attached to the main frame, a pair of vertically moving lifting planes on each side of each tilting frame, means for maintaining said planes in a l orizontal position when traveling in a downward direction and in a vertical position when travel in an upward direction, a propeller at each end of the main frame, an engine, means for transmitting power from said engine to drive the propellers in unison in one direction or the other, and means for transmitting power from the same engine to drive the lifting planes in unison or at variable speeds with relation to each other, said means adapted to be manually and automatically controlled.

12. In a flying machine, a main frame, a vertical frame at each end of the main frame, lifting means carried by the vertical frames, means common to each of said lifting means to drive same, means controlling said driving means for maintaining endwise equilibrium by varying the relative speeds of the lifting means, a pendulum frame pivotally carried by the main frame, and a pivotal connection between the pendulum frame and said equilibrium maintaining means for operating the latter from the former.

13. In a flying machine, a pair of endless belts, guiding means for one belt to cause same to follow a rectangular outline, guiding means for the other belt to cause same to follow a substantially L-shaped outline within the first belt and with one course vertical and parallel to the adjacent end course of the first belt, and lifting planes carried by the respective belts for vertical disposition between said parallel courses of the belts.

14. In a flying machine, a frame, lifting means at each end of the frame, a single driving means, adjustable means to actuate each of said lifting means from said driving means, a pendulum frame, and pivotal means connecting the pendulum frame with the adjusting means to set the latter to obtain different relative speeds of the lifting means.

15. In a flying machine, a pair of endless belts, lifting planes carried by the belts, and guiding means for each belt to cause same to effect horizontal and vertical movement of the planes and to cause movement of the planes without folding in changing from vertical to horizontal movement and vice versa.

16. In a flying machine, a frame, lifting means at each end of the frame, a clutch drive for each lifting means, a single means to drive each of the clutches, means to adjust the clutches to vary the drive thereof, a pendulum, and a rod connecting the adjusting means, and connected to the pendulum.

17. In a flying machine, a frame having lifting means at each end, a single driving means for the lifting means, and means for automatically increasing the speed of the lifting means at one end with respect to the lifting means at the other end including a clutch for each lifting means, means to adjust each clutch, a pendulum, and a slidable element connected to the pendulum and to each adjusting means.

18. In a flying machine, a frame having lifting means at each end, driving means for the lifting means, and means for automatically increasing the speed of the lifting means at one end with respect to the lifting means at the other end including a clutch for each lifting means, a bell crank for each clutch, means to operate the bell cranks to obtain different adjusted positions thereof, and an adjustable connection between the bell cranks and the clutches for setting the latter.

In testimony whereof I have hereunto set my hand in the presence of two subscribing witnesses.

JASPER J. WALK.

Witnesses:
 JOHN H. HERRING,
 W. W. HEALEY.